United States Patent
Henningsen (10) Patent No.: US 9,345,314 B2
(45) Date of Patent: May 24, 2016

(54) AUTOMOTIVE SNOW BRUSH WITH SQUEEGEE

(76) Inventor: Richard Henningsen, Glen Head, NY (US)

( * ) Notice: Subject to any disclaimer, the term of this patent is extended or adjusted under 35 U.S.C. 154(b) by 0 days.

(21) Appl. No.: 13/613,097

(22) Filed: Sep. 13, 2012

(65) Prior Publication Data

US 2013/0097793 A1    Apr. 25, 2013

Related U.S. Application Data

(60) Provisional application No. 61/549,529, filed on Oct. 20, 2011.

(51) Int. Cl.
| | |
|---|---|
| *A47L 13/12* | (2006.01) |
| *A46B 5/00* | (2006.01) |
| *A46B 15/00* | (2006.01) |
| *B60S 3/04* | (2006.01) |

(52) U.S. Cl.
CPC .............. *A46B 5/005* (2013.01); *A46B 15/0081* (2013.01); *B60S 3/045* (2013.01); *A46B 5/0095* (2013.01); *A46B 2200/3046* (2013.01)

(58) Field of Classification Search
CPC ................... A46B 15/0081; A46B 2200/3046; A46B 5/005; A47L 13/12
USPC ............. 15/105, 111, 117, 121, 144.1, 144.2, 15/144.3, 144.4, 172, 184, 245, 236.02; D4/116, 118, 130, 132
See application file for complete search history.

(56) References Cited

U.S. PATENT DOCUMENTS

| | | | |
|---|---|---|---|
| 2,856,621 A | 10/1958 | Racicot | |
| 3,017,649 A | 1/1962 | Racicot | |
| D231,283 S * | 4/1974 | Jordan | D4/132 |
| 3,968,535 A | 7/1976 | Nichola, Jr. | |
| 3,995,345 A | 12/1976 | Larsson | |
| 4,124,915 A | 11/1978 | Schlicher | |
| 4,281,433 A | 8/1981 | Sendoykas | |
| 4,302,862 A * | 12/1981 | Machacek et al. | 15/117 |
| 4,409,700 A * | 10/1983 | Sullivan | 15/121 |
| 4,809,386 A | 3/1989 | Re | |
| 4,908,900 A * | 3/1990 | McLaughlin et al. | 15/111 |
| 4,922,569 A | 5/1990 | Brinker et al. | |
| 4,939,807 A | 7/1990 | Hencz | |
| 5,088,147 A * | 2/1992 | MacMillan | 15/144.4 |
| 5,113,547 A * | 5/1992 | Mayhew | 15/322 |
| 5,634,232 A * | 6/1997 | Brenneman | A46B 15/00 15/1.7 |
| D389,319 S * | 1/1998 | Gelinas | D4/132 |
| 5,810,856 A * | 9/1998 | Tveras | 606/161 |
| 5,819,355 A * | 10/1998 | Wu | 15/106 |

(Continued)

OTHER PUBLICATIONS

International Search Report & Written Opinion issued in the counterpart PCT/US12/59424, ISA/US, Jan. 8, 2013.

*Primary Examiner* — Michael Jennings
(74) *Attorney, Agent, or Firm* — Gottlieb, Rackman & Reisman, PC (57) ABSTRACT

A snow brush assembly is formed of a brush handle ergonomically designed, angled at each end thereof. These angles allow the user to stand clear of the vehicle and direct snow away from the person, keeping the person dry and clean. A brush head is attached at one end of the brush handle and includes a brush holder with a brush that can be positioned at various angles relative to the brush handle. A protective cover is selectively installed over the brush and is provided with squeegee. An ice scraper is removably attached to another end of the brush handle.

8 Claims, 13 Drawing Sheets

(56) References Cited

U.S. PATENT DOCUMENTS

| | | | |
|---|---|---|---|
| 5,908,255 A | 6/1999 | Branch | |
| 6,018,836 A | 2/2000 | Williams | |
| 6,026,535 A * | 2/2000 | Lankowski | A45D 34/04 15/144.1 |
| 6,032,321 A * | 3/2000 | Shirey et al. | 15/244.2 |
| 6,155,620 A * | 12/2000 | Armstrong | 294/57 |
| 6,189,222 B1 * | 2/2001 | Doyle | 30/531 |
| D441,198 S * | 5/2001 | Primeau | D32/42 |
| 6,243,906 B1 * | 6/2001 | Holliday et al. | 15/111 |
| D453,075 S * | 1/2002 | Liu | D4/118 |
| 6,481,041 B1 * | 11/2002 | Ingram | 15/111 |
| 6,575,511 B2 * | 6/2003 | Hultstrand | 294/54.5 |
| 6,625,837 B2 * | 9/2003 | Jiang | 15/105 |
| D485,031 S | 1/2004 | Anderson et al. | |
| D497,483 S * | 10/2004 | Bock | D32/42 |
| 6,804,853 B2 * | 10/2004 | Wang | 15/172 |
| D501,727 S * | 2/2005 | Liu | D4/118 |
| 6,990,705 B1 | 1/2006 | Schouten et al. | |
| 7,155,770 B2 * | 1/2007 | Anderson et al. | 15/111 |
| 7,213,292 B1 * | 5/2007 | Tucker | 15/144.1 |
| D560,364 S * | 1/2008 | Barnes | D4/118 |
| D562,000 S * | 2/2008 | Liu | D4/118 |
| D562,562 S * | 2/2008 | Wales | D4/114 |
| D564,230 S * | 3/2008 | Schouten | D32/49 |
| 7,343,637 B2 * | 3/2008 | Lafleur | 15/111 |
| 7,347,468 B1 * | 3/2008 | Tidcomb | 294/51 |
| D572,011 S * | 7/2008 | Zemel | D4/118 |
| D572,012 S * | 7/2008 | Zemel | D4/118 |
| 7,533,436 B2 | 5/2009 | Vaartjes et al. | |
| D597,315 S * | 8/2009 | Hoffelner | D4/118 |
| 7,617,559 B2 * | 11/2009 | Jiang | 15/111 |
| 7,784,200 B2 | 8/2010 | Nagamatsu et al. | |
| D656,736 S * | 4/2012 | Hoffelner | D4/118 |
| 8,166,602 B2 * | 5/2012 | Paterson | 15/236.04 |
| 8,312,589 B1 * | 11/2012 | Thomas | 15/236.02 |
| 2002/0056197 A1 * | 5/2002 | Johnson | 30/34.05 |
| 2002/0078518 A1 * | 6/2002 | Jiang | 15/111 |
| 2002/0078519 A1 * | 6/2002 | Boothby | 15/121 |
| 2004/0154117 A1 | 8/2004 | Patterson | |
| 2004/0250365 A1 * | 12/2004 | Anderson et al. | 15/111 |
| 2005/0251940 A1 * | 11/2005 | Black | 15/144.1 |
| 2006/0037159 A1 * | 2/2006 | Wang | 15/144.1 |
| 2006/0064831 A1 * | 3/2006 | Wells | 15/105 |
| 2006/0207042 A1 * | 9/2006 | Di Paolo | 15/111 |
| 2007/0020030 A1 * | 1/2007 | Goulet et al. | 401/140 |
| 2007/0187964 A1 * | 8/2007 | Marble | 294/51 |
| 2007/0212157 A1 * | 9/2007 | Hoadley et al. | 401/136 |
| 2007/0234497 A1 * | 10/2007 | Lee | 15/144.1 |
| 2008/0092314 A1 * | 4/2008 | Griffin | 15/111 |
| 2008/0256732 A1 | 10/2008 | Donatelli et al. | |
| 2008/0295779 A1 * | 12/2008 | Dehoff | 119/479 |
| 2009/0106919 A1 * | 4/2009 | Montgomery | A46B 5/005 15/105 |
| 2009/0183330 A1 * | 7/2009 | Jiang | B25G 1/04 15/144.4 |
| 2009/0188061 A1 * | 7/2009 | Cybulski et al. | 15/111 |
| 2009/0235474 A1 * | 9/2009 | Seigel | 15/111 |
| 2010/0102584 A1 | 4/2010 | Sanchez | |
| 2010/0186183 A1 | 7/2010 | Weinberger et al. | |
| 2011/0188923 A1 * | 8/2011 | Lafleur et al. | 403/53 |

* cited by examiner

AUTOMOTIVE SNOW BRUSH WITH SQUEEGEE

RELATED APPLICATIONS

This application claims priority to U.S. provisional application No. 61/549,529, filed Oct. 20, 2011, the contents of which are herein incorporated by reference in its entirety.

BACKGROUND OF THE INVENTION

A. Field of Invention

The present invention relates to automotive accessories and, more particularly, to an automotive snow brush with a multi-position locking brush head, extension handle and ice scraper. A protective sleeve is provided on the brush head with an integral squeegee.

B. Description of the Prior Art

A conventional straight, fixed snow brush/scraper requires the operator to lean on cold, wet vehicles to clear snow or balance precariously on door jambs while clearing roof snow. The standard straight extension brush often requires operators to clear snow with arms extended overhead, a strenuous and awkward task that increases the risk of upper back, neck, arm and shoulder strain. Both of these conventional snow brushes utilize a smaller working surface, thereby increasing time required to clear snow from vehicles. Storage of the straight extension brushes can be difficult in smaller vehicles, with some brushes, unextended, measuring up to 48 inches in length.

Conventional snow brushes often come with brushes on one end and a scraper on the other end. However, as liquids melt, a squeegee could be helpful for clearing off the vehicle. In these situations, the user needs to use a separate squeegee with these conventional snow brushes.

As can be seen, there is a need for an improved snow brush that overcomes the issues encountered with conventional snow brushes.

SUMMARY OF THE INVENTION

In one aspect of the present invention, a snow brush assembly includes a brush handle, a brush head attached to one end of the brush handle, a brush holder with a brush attached to the brush head. The brush handle includes two ends connected to a central portion thereof by a corresponding elbow. The brush head is attached to one end, and an optional ice scraper is removably attached to the second end. The ends are disposed at an angle of between 5 and 30 and preferably between 7 and 15 degrees to the central portion.

In another aspect of the present invention, a snow brush assembly comprises an extension tube; a handle tube fitting at least partially inside and extendable from the extension tube; a brush head attached to a first end of the handle tube; a brush holder attached to the brush head, the brush holder being pivotable relative to the brush head. At least one brush attached to the brush holder. An ice scraper is removably attached to a first end of the extension tube. A protective cover is attached to the brush holder. The protective cover is provided with a squeegee blade. The extension tube has an extension tube bend proximate to the ice scraper; the handle tube has a handle tube bend at the first end thereof; and the extension tube bend and the handle tube bend is from about 5 to about 30 degrees, usually about 7 to about 15 degrees.

These and other features, aspects and advantages of the present invention will become better understood with reference to the following drawings, description and claims.

DETAILED DESCRIPTION OF THE INVENTION

The following detailed description is of the best currently contemplated modes of carrying out exemplary embodiments of the invention. The description is not to be taken in a limiting sense, but is made merely for the purpose of illustrating the general principles of the invention, since the scope of the invention is best defined by the appended claims.

Referring to FIGS. 1 through 9, a snow brush assembly 10 includes a brush head 12 attached to a handle tube 14. The handle tube 14 slides telescopically into an end of an extension tube 16. The extension tube is connected to a scrapper 18 at the opposite end.

A button housing 20 is mounted on the extension tube 16 and includes a button 22. Preferably, a plurality of length adjustment holes 30 are provided along the handle tube 14. The button 22 in the button housing 20 selectively engages one of the adjustment holes thereby allowing user to adjust the length of the snow brush assembly 10. To change the length, a user can depress the button 22 and slide the handle tube 14 so that the button 22 engages a different length adjustment hole 30.

Figure 7:
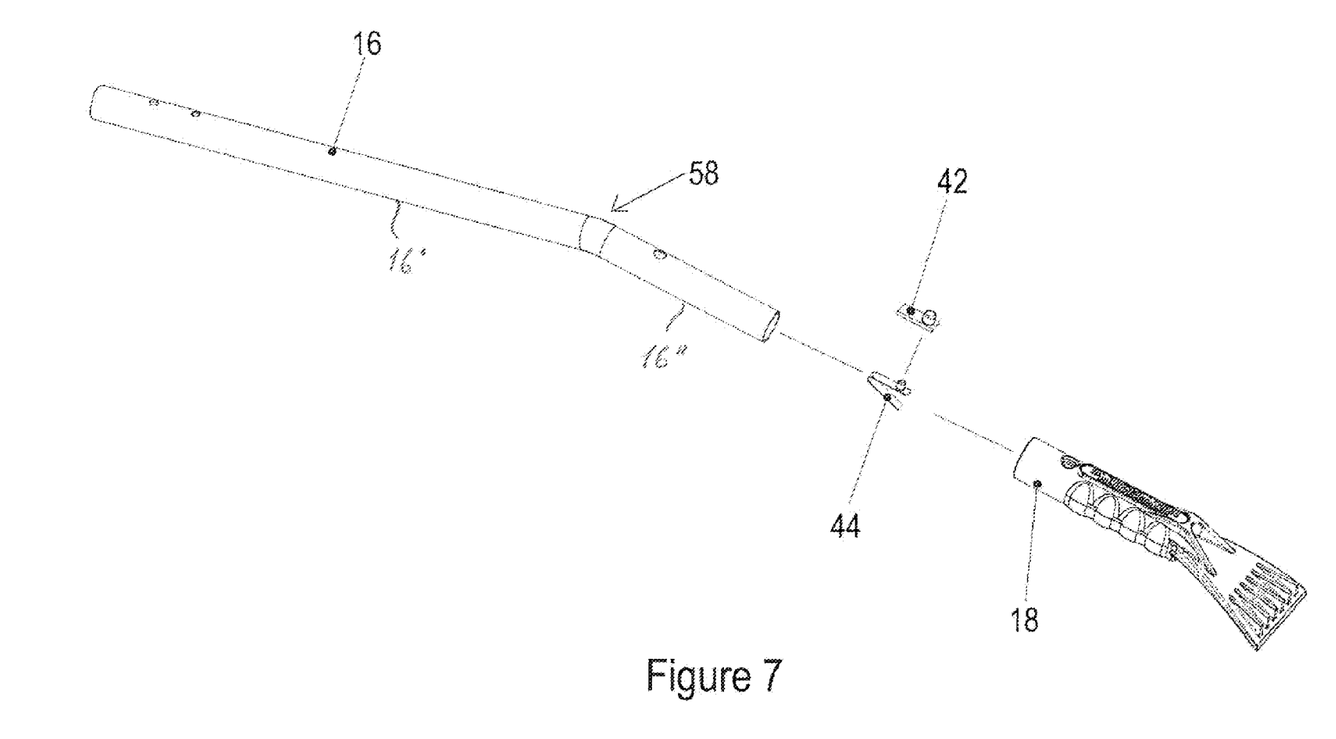
FIG. 7 is an exploded perspective view of a scraper end of the snow brush of FIG. 1.

The scraper 18 can be removable attached on the other end 16" of the extension tube 16. The scraper 18 can be used as a hand held scraper when removed from the extension tube 16, or can be used with the snow brush assembly 10.

Figure 9:
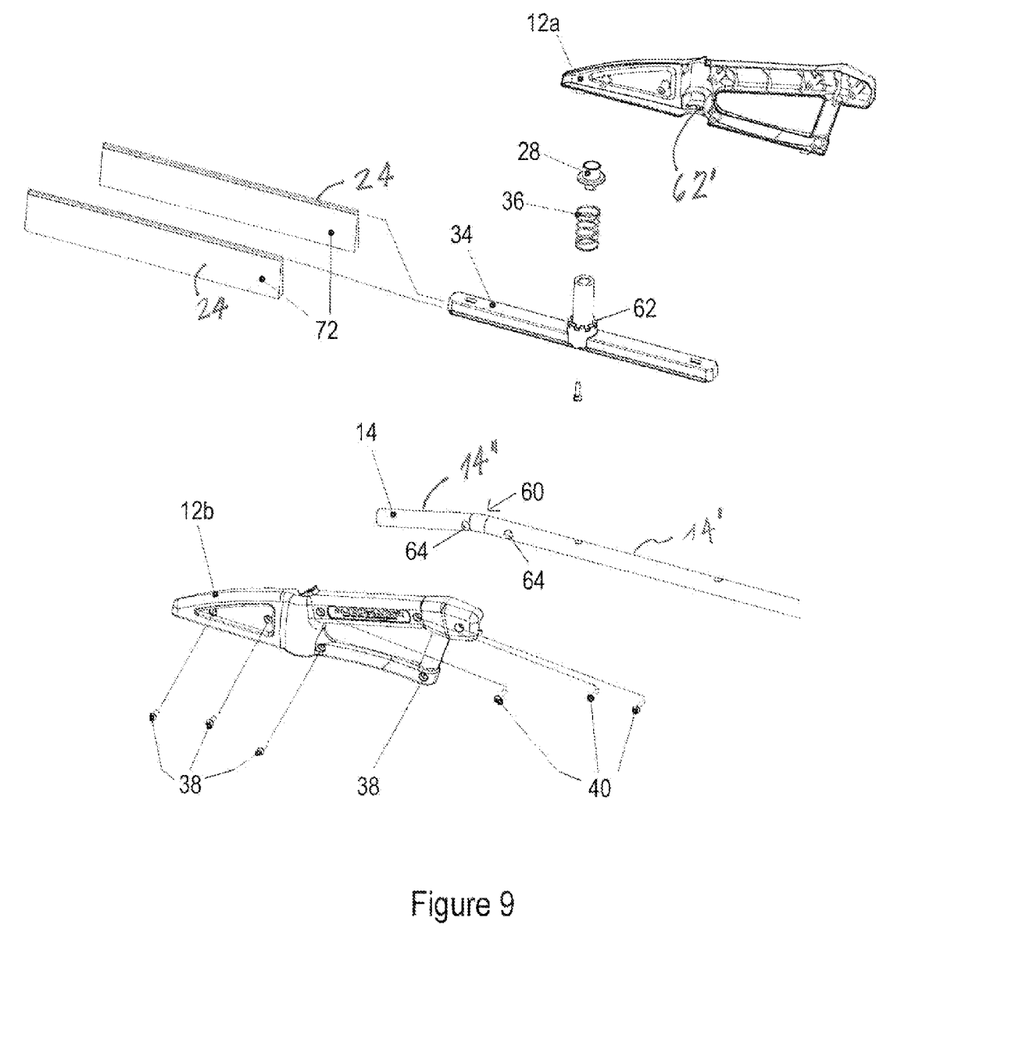
FIG. 9 is an exploded perspective view of the head of the snow brush of FIG. 1, with the squeegee removed.

As shown in FIG. 7, the extension tube 16 can have an elbow 58 proximate to the scraper 18. The elbow 58 is arranged to form an angle from about 5 to about 30 degrees, and preferably from about 7 to about 15 degrees between a main portion 16' of the extension tube 16 and extension end 16". Similarly, as shown in FIG. 9, the handle tube 14 can have an elbow 60 between main handle portion 14' and end 14'. This elbow 60 can define an angle from about 5 to about 30 degrees, and preferably from about 7 to about 15 degrees therebetween.

The tube handle 14 and extension tube 16 together define a brush handle having a straight middle segment formed of portions 14', 16' and ends 14", 16" positioned at a respective angle from the straight segment by respective elbows 58, 60.

Figure 5:
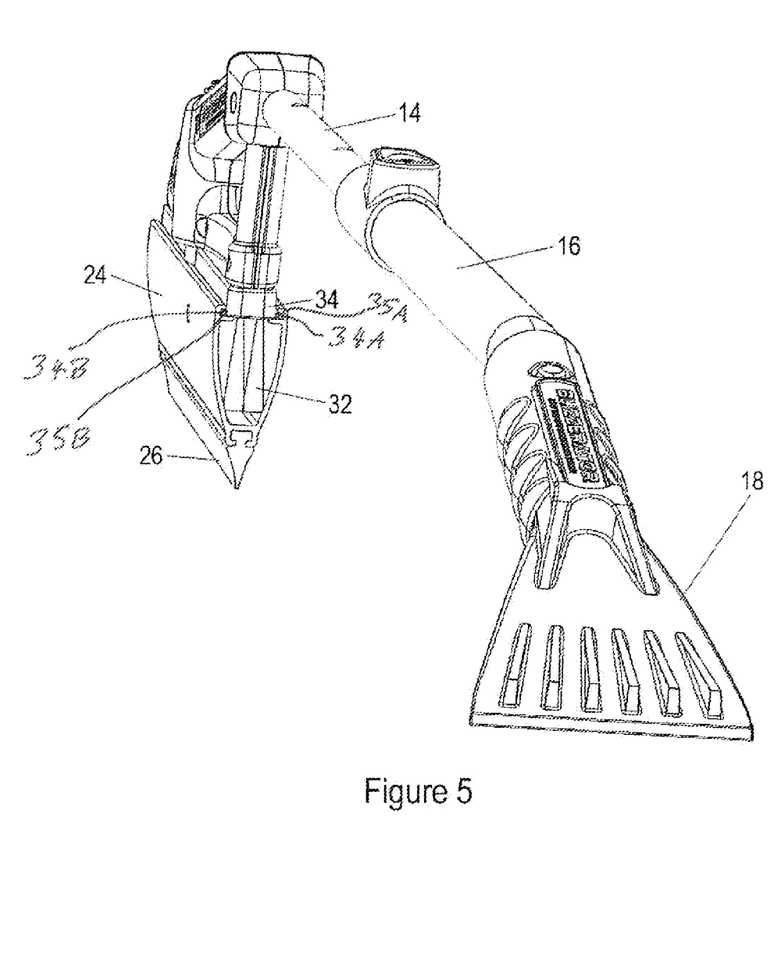
FIG. 5 is a scraper end perspective view of the snow brush of FIG. 1.
Figure 6:
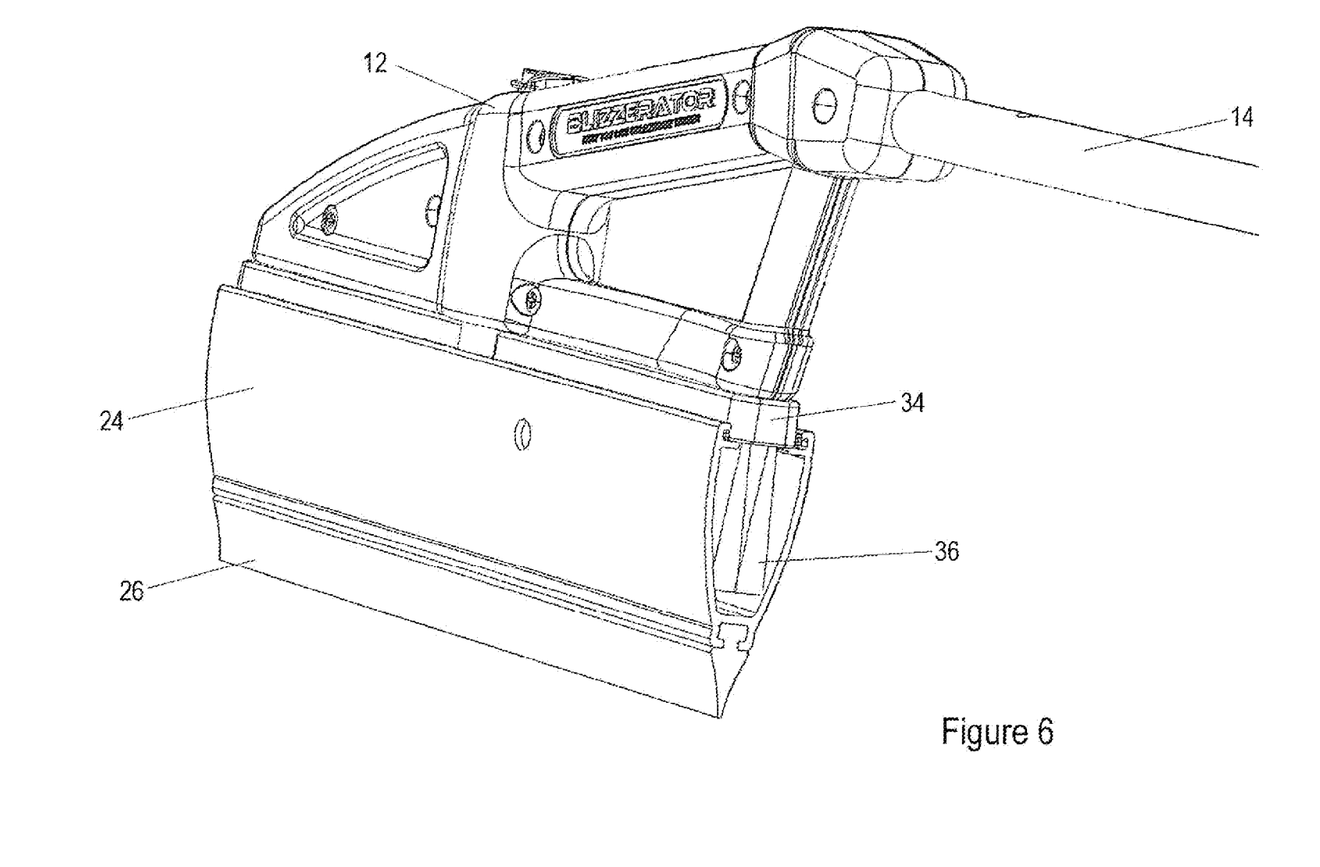
FIG. 6 is a close-up perspective view of the brush end of the snow brush of FIG. 1.

As best viewed from FIGS. 5, 6 and 9, the brush head 12 can be formed from two halves 12a, 12b and can support a brush holder 34 along one edge thereof. The brush holder 34 can hold one or more rows of brushes 32, for example, two rows of brushes 32.

When a user desires to use the snow brush assembly 10 as a squeegee, or for storing the snow brush assembly 10 and protect the brushes 32, the user can attach a protective cover 24 over the brushes. The protective cover 24 can attach either to the brush holder 34 of to the brush head 12 by various mechanisms. The protective cover 24 can extend over and around the brushes 32. A squeegee blade 26 can fit along the bottom edge of the protective cover 24.

As best shown in FIG. 5, the brush holder 34 is formed with two longitudinal ribs 34A, 34B and the protective cover 24 has two matching grooves 35A, 35B. These interconnecting elements allow the protective cover to be slipped over the brushes 32 of brush holder 34 and be seated solidly thereon. As a result, when the squeegee blade 26 can be used effectively without fear of having the cover fall off. Holes 72 in the cover can be used to pass a plastic or metal wire through the protective cover to insure that the cover is not removed while the brush assembly is displayed in a store.

Figure 1:
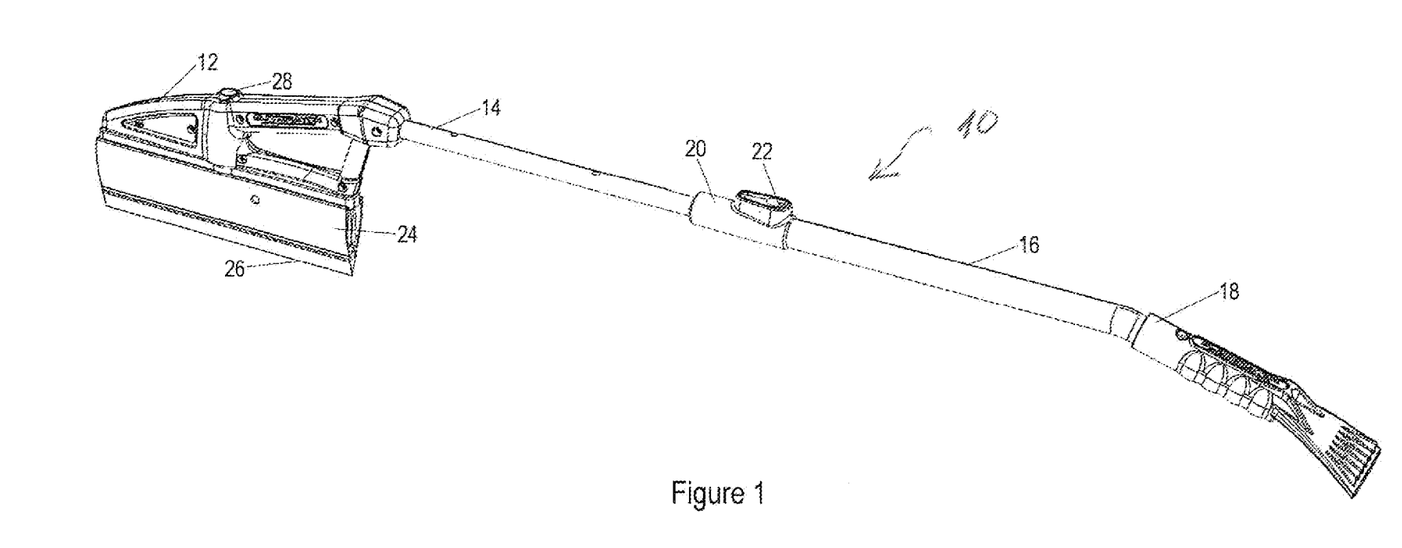
FIG. 1 is a perspective view of a snow brush constructed according to an exemplary embodiment of the present invention.
Figure 2:
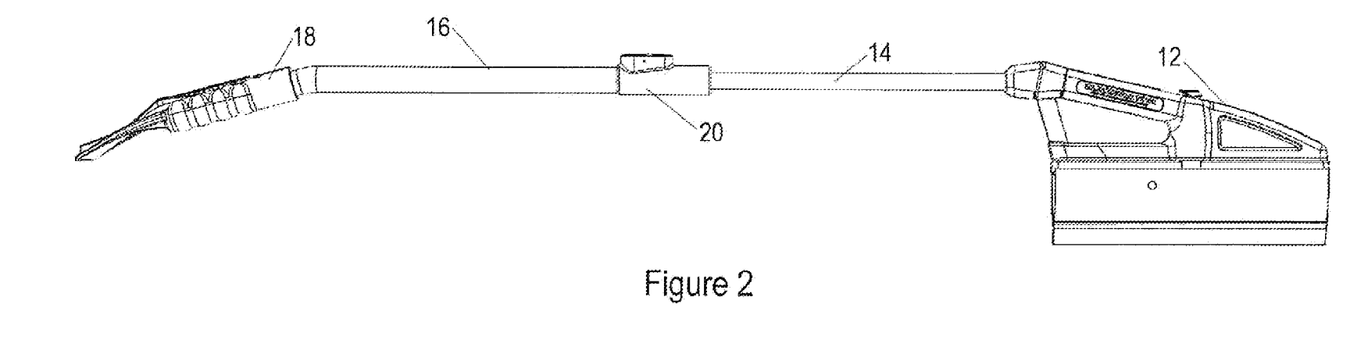
FIG. 2 is a side view of the snow brush of FIG. 1.
Figure 3:
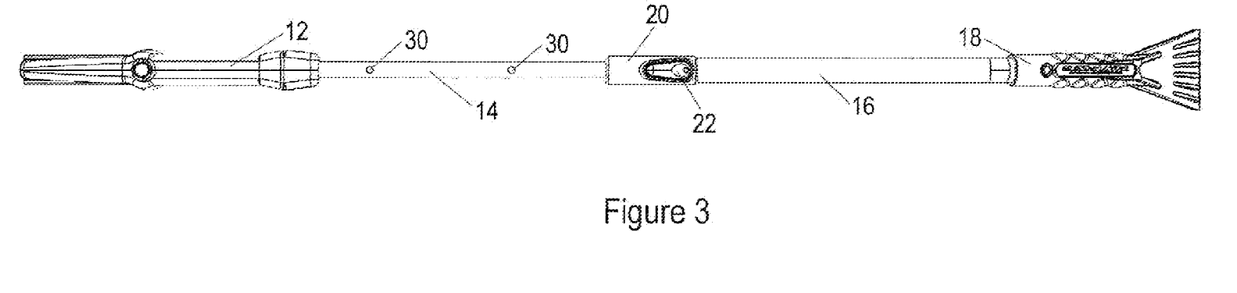
FIG. 3 is a top view of the snow brush of FIG. 1.
Figure 4:
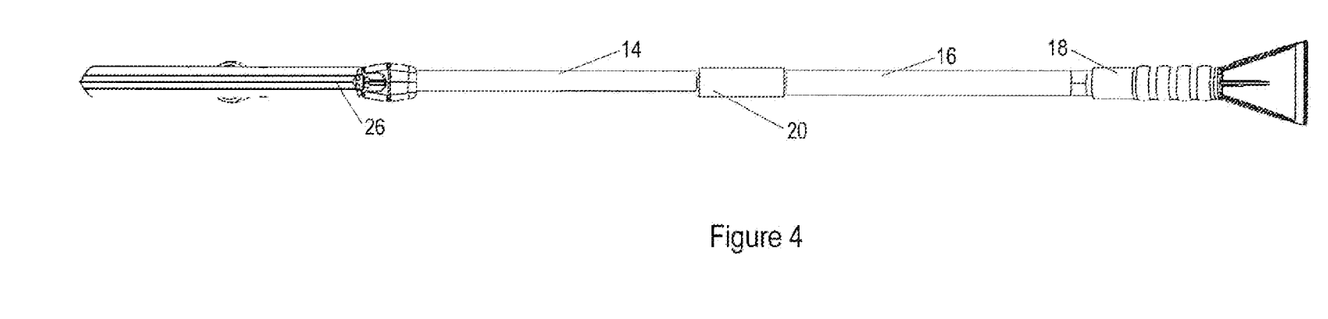
FIG. 4 is a bottom view of the snow brush of FIG. 1.

The brush head 12 supports a pivot button 28 depressible from the top of the brush head 12, for example. A spring 36 can retain the pivot button 28 in an undepressed state. The pivot button 28 can push the brush holder 34 out from a locked position so that the user can rotate the brushes 32 to any desired angle relative to the handle tube 14. When the button is released, the brush holder moves back toward the brush head 12 and is locked in position. In some embodiments, the brush holder 34 can lock in at least two positions, a first position where the brushes 32 are parallel to or collinear with the handle tube 14 (as shown in FIG. 1, for example), and a second position where the brush holder 34 is perpendicular to the handle tube 14. In another embodiment, the brush holder 34 can be positioned at other angles. Of course, stops between the first and second position can be provided within the scope of the present invention. Various mechanisms can be used to lock the brush holder 34 relative to the brush head 12. For example, teeth 62 can be provided about a shaft connected to the brush holder 34. These teeth 62 can engage with mating teeth 62' inside the brush head 12.

The brush head halves 12a, 12b can be joined together with a plurality of fasteners 38, 40 passing through holes in one of the halves 12b. One or more of these fasteners 38, 40 can pass through holes 64 in the end of the handle tube 14, securing the handle tube 14 to the brush head 12.

At the opposite end of the snow brush assembly, as shown in FIG. 7, the scraper 18 can be removably attached to the extension tube 16. Various mechanisms can be provided for removably attaching the scraper 18 with the extension tube 16. For example, a snap button cover 42 can be accessible from the scraper 18, where depressing the snap button cover 42 and press a snap button 44, allowing the snap button 44 to remove its engagement of the scraper 18 to the extension tube 16.

Figure 8:
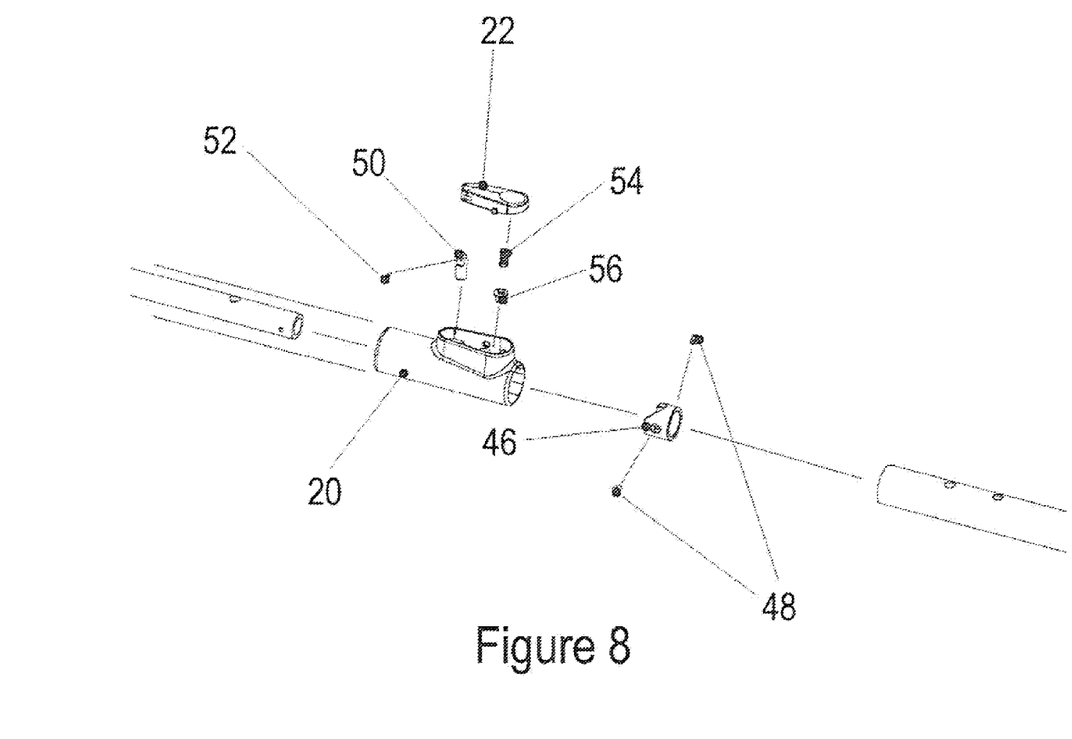
FIG. 8 is an exploded perspective view of a mid-section of the snow brush of FIG. 1.

Referring now to FIG. 8, in a mid-section of the snow brush assembly 10, the extension tube 16 can join with the handle tube 14. Various mechanisms can be provided to allow the handle tube 14 to fit inside the extension tube 16 and lock at various lengths. One such embodiment is shown in FIG. 8, where the button housing 20 includes a button 22 that can be retained in an un-depressed state with a catch spring 54 and a button spring pin 56. A catch pin 50 can be disposed adjacent to the button 22 and a catch pin yoke 52 may be provided to join the catch pin 50 to the button 22. When the button 22 is depressed, it can release the catch pin 50 from engagement with the length adjustment hole 30 in the handle tube 14, allowing the handle tube 14 to slide in and out of the extension tube. When the button 22 is un-depressed, the catch pin 50 can engage with one of the length adjustment holes 30 to lock the snow brush assembly 10 at a desired length. A stop ring 46 can be connected to the end of the handle tube 14 to prevent the handle tube 14 from being pulled completely out of the extension tube 16. Fasteners, such as rivets 48 can join the stop ring 46 to the end of the handle tube 12.

The brushes 32 can be made from various materials and may be from about 10 to about 16 inches long, typically about 12 inches long. The squeegee blade 26 and protective cover 24 can be the same length as or up to about one inch longer than the brushes 32. The handle tube 14 and the extension tube 16 can be made of various materials, such as plastic, aluminum, or the like. In some embodiments, the tubes 14, 16 can be made of hollow aluminum tubes. In some embodiments, the handle tube 14 can have an inside diameter of about 1.125 inch, while the extension tube 16 can have an inside diameter of about 1.25 inch. Of course, other sizes of tubes 14, 16 can be used within the scope of the present invention. The handle tube 14 and extension can be 12-24 inches long. As shown in FIG. 7, the second end 16" of extension tube 16 is much shorter than the main portion 16. In an alternate embodiment, the end 16" is the same length as main portion 16 or even longer. This embodiment is suitable for cleaning taller vehicles.

The brush head halves 12a, 12b can be made from various materials, such as metal, plastic, composite, or the like. Typically, the brush head 12 is made of a plastic material. Other elements of the present invention, such as the scraper 18, the brush holder 34, and protective cover 24 can be made of plastic. The plastic can be formed by conventional methods, including injection molding, for example.

To use the snow brush assembly 10 of the present invention, in light snow, the operator can utilize the brush in an inline or angled configuration to dust snow from the vehicle. With heavier snow, vehicles may be cleaned by depressing the brush head release button and rotating the rotating brush head to a desired angle and locking the brush head into position by releasing the button.

Figure 10A:
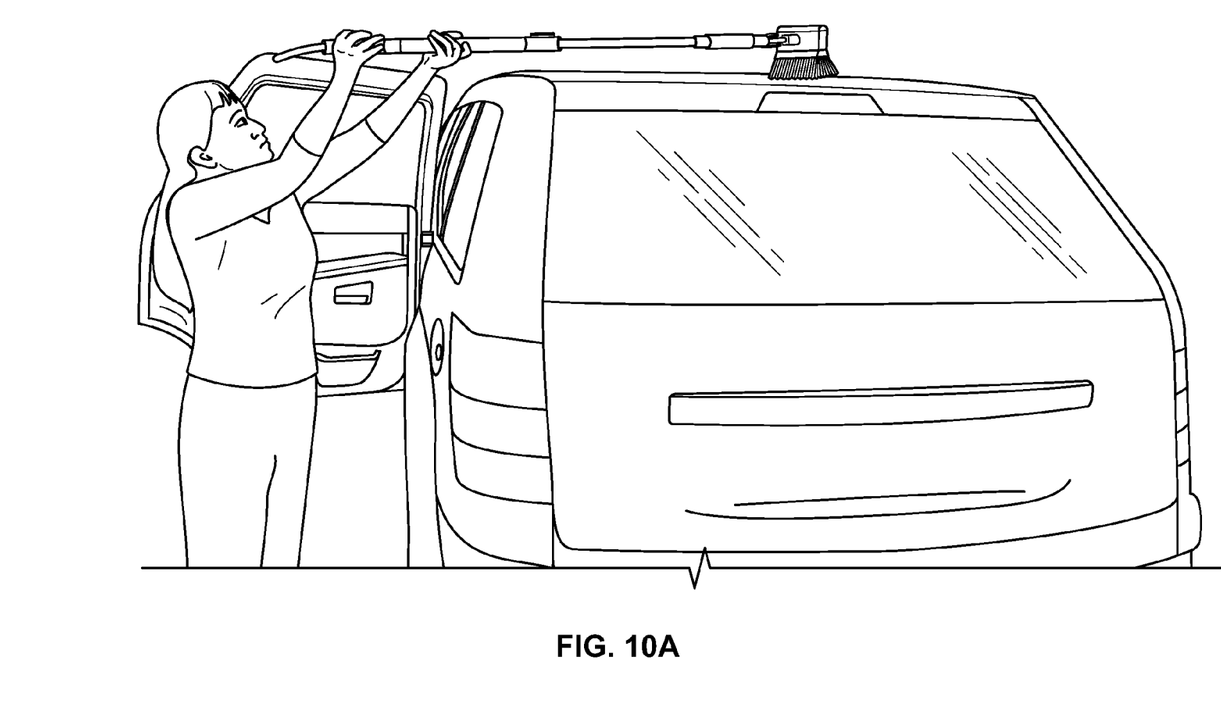
FIG. 10A shows a person using a standard snow brush on an SUV-type vehicle.
Figure 10B:
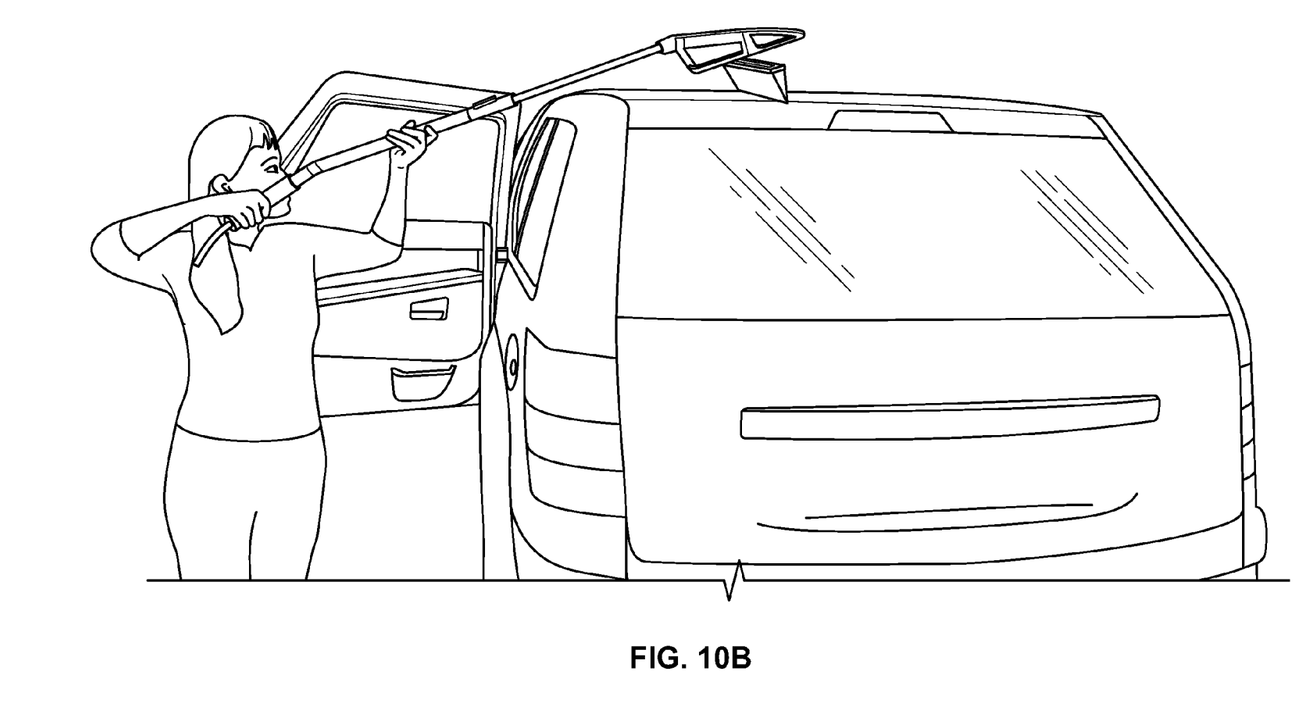
FIG. 10B shows a person using the snow brush of FIGS. 1-9 on an SUV-type vehicle.

For example, as shown in FIG. 10A, a person using a standard brush has a hard time cleaning the roof using a standard brush. The same task can be performed easier and faster using the present invention. The person can begin to clear show while standing back from the vehicle, and, with the brush holder at right angle, push the snow to the other side.

Figure 11A:
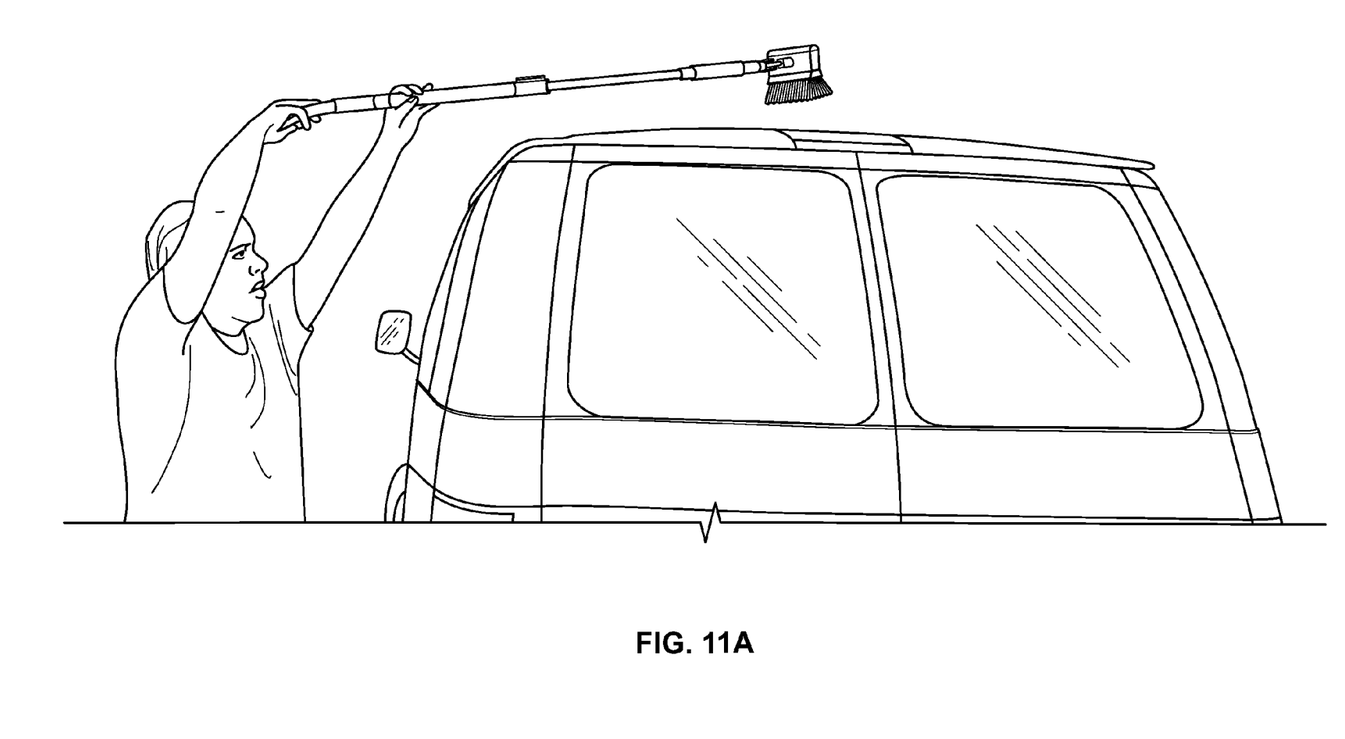
FIG. 11A shows a person using a standard snow brush on a van-type vehicle.
Figure 11B:
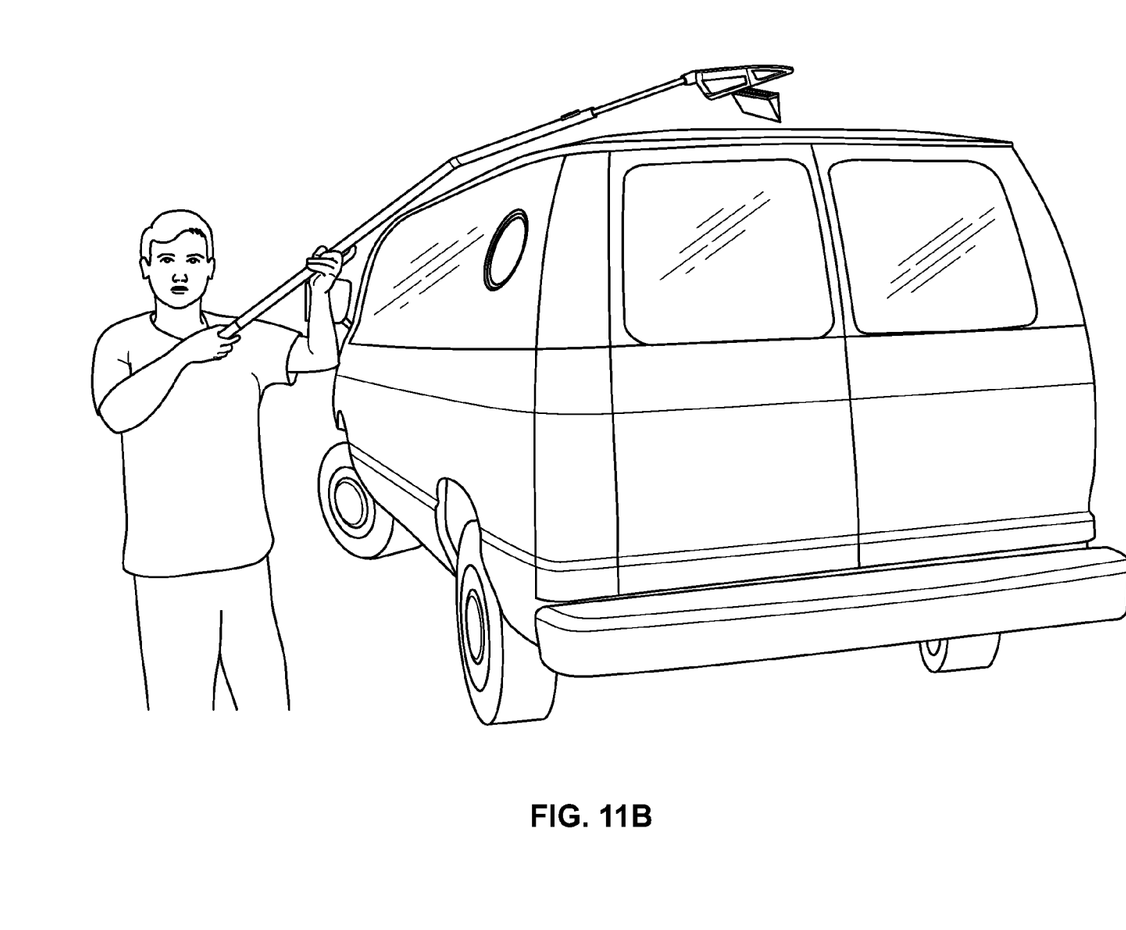
FIG. 11B shows a person using the snow brush of FIGS. 1-9 on a van-type vehicle.

The problem with standard brushes is even more pronounced for vans and similar vehicle, even for a tall person, as demonstrated in FIG. 11A. Moreover, a person must push off the snow in an overhead position using only his elbows and arms, thereby exposing himself to potential injury. The present invention can be used advantageously for vehicle roof clearing and for larger vehicles, by extending the extension tube to its fullest length. Alternatively, if this is insufficient, another extension tube can be used that has a second end that is longer as discussed above and shown in FIG. 11B. This can allow the person to clean the roof of even a van without needing the overhead position, but instead enabling the person to push the snow over the roof using his or her shoulders, reduce stress to the user's upper back, neck, arms and shoulders, allowing the person to avoid injury and remain clean and dry.

It should be understood, of course, that the foregoing relates to exemplary embodiments of the invention and that modifications may be made without departing from the spirit and scope of the invention as set forth in the following claims.

I claim:

1. An assembly for cleaning, comprising:
   a monolithic extension tube comprising of a body having a first end and a second end with the first end of the body fixed at a first angle;
   a monolithic handle tube comprising of a body having a first end and a second end with the second end of the body of the handle tube being fixed at a second angle, the handle tube being attached telescopically at the first end of thereof to the second end of the extension tube and the handle tube being extendable collinearly from the extension tube;
   a first cleaning implement head attached to and encompassing the first end of said extension tube; and
   a second cleaning implement attached to the second end of the handle tube, the second cleaning implement being pivotable relative to the handle tube about a longitudinal axis of said handle tube,
   wherein said first angle of said extension tube and said second angle of said handle tube are each between 5 and 30 degrees defining a convex shape with an imaginary straight line extending between said first end of said extension tube and said second end of said handle tube.

2. The assembly of claim 1, wherein said first angle of said extension tube is between 7 and 15 degrees.

3. The assembly of claim 1, wherein said second angle of said handle tube is between 7 and 15 degrees.

4. The assembly of claim 1, further comprising an ice scraper removably attached to said second end of said handle tube.

5. The assembly of claim 1, wherein said extension tube includes a main portion, said extension tube end having a length at least equal to the length of said main portion.

6. The assembly of claim 1, further comprising a coupling member selectively coupling said handle tube and said extension tube in one of a first position and a second position, wherein an overall length of said handle tube and said extension tube that are selectively coupled together is dependent on whether said handle tube and said extension tube are in said first position or said second position.

7. The assembly of claim 1, further comprising a protective cover removably attachable to said second end of said extension tube.

8. The assembly of claim 1, wherein said second cleaning implement includes a squeegee blade.

* * * * *